US010581573B2

(12) United States Patent
Choi et al.

(10) Patent No.: US 10,581,573 B2
(45) Date of Patent: Mar. 3, 2020

(54) APPARATUS, TERMINAL AND SIGNAL TRANSMITTING AND RECEIVING METHOD THEREOF IN A WIRELESS COMMUNICATION SYSTEM

(71) Applicant: Samsung Electronics Co., Ltd., Suwon-si, Gyeonggi-do (KR)

(72) Inventors: Chanho Choi, Hwaseong-si (KR); Seijoon Shim, Seoul (KR); Chongdon Kim, Seongnam-si (KR); Hayoung Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/941,780

(22) Filed: Mar. 30, 2018

(65) Prior Publication Data
US 2018/0287760 A1 Oct. 4, 2018

(30) Foreign Application Priority Data

Mar. 31, 2017 (KR) .................. 10-2017-0042198
Mar. 29, 2018 (KR) .................. 10-2018-0036849

(51) Int. Cl.
*H04L 5/00* (2006.01)
*H04W 72/04* (2009.01)
(Continued)

(52) U.S. Cl.
CPC .......... *H04L 5/0048* (2013.01); *H04J 11/005* (2013.01); *H04L 5/005* (2013.01);
(Continued)

(58) Field of Classification Search
CPC .................................................... H04L 5/0048
(Continued)

(56) References Cited

U.S. PATENT DOCUMENTS

2012/0329400 A1 12/2012 Seo et al.
2015/0188650 A1 7/2015 Au et al.
(Continued)

FOREIGN PATENT DOCUMENTS

WO 2011/118993 A2 9/2011

OTHER PUBLICATIONS

Ericsson: "NR/L TE co-existence—Oownlink", 3GPP Oraft: R1-1703026. 3RO Generation Partnership Project (3GPP), Mobile Competence Centre; 650, Route Oes Lucioles; F-06921 Sophia-Antipolis Ceoex; France, vol. RAN WG1, No. Athens, Greece; Feb. 13, 2017-Feb. 17, 2017 Feb. 12, 2017 (Feb. 12, 2017), XP051210166, Retrieved from the Internet:URL:http://www.3gpp.orglftp/Meetings_36PP SYNC/RAN1/00cs/, [retrieved on Feb. 12, 2017].
(Continued)

*Primary Examiner* — Peter G Solinsky
(74) *Attorney, Agent, or Firm* — Jefferson IP Law, LLP

(57) ABSTRACT

The present disclosure relates to a 5G or a pre-5G communication system for supporting a higher data rate beyond 4G communication systems such as LTE. A signal transmitting method of an apparatus according to an embodiment of the present disclosure may include: confirming a location of a control signal for a first communication system when a transmission band of the first communication system and a transmission band of a second communication system overlap each other; puncturing a signal for the second communication system at the confirmed location of the control signal for the first communication system; and transmitting the punctured signal for the second communication system.

17 Claims, 21 Drawing Sheets

(51) Int. Cl.
  *H04J 11/00*  (2006.01)
  *H04W 72/12*  (2009.01)
(52) U.S. Cl.
  CPC .......... *H04L 5/0073* (2013.01); *H04L 5/0094* (2013.01); *H04W 72/044* (2013.01); *H04L 5/0005* (2013.01); *H04L 5/0053* (2013.01); *H04W 72/12* (2013.01)
(58) Field of Classification Search
  USPC .......................................................... 370/329
  See application file for complete search history.

(56) References Cited

U.S. PATENT DOCUMENTS

| | | | | |
|---|---|---|---|---|
| 2019/0090272 | A1* | 3/2019 | Lee | H04W 72/04 |
| 2019/0098608 | A1* | 3/2019 | Yi | H04L 5/0007 |
| 2019/0132837 | A1* | 5/2019 | Yi | H04L 5/00 |
| 2019/0150029 | A1* | 5/2019 | Zhang | H04W 28/06 |
| 2019/0245726 | A1* | 8/2019 | Boudreau | H04L 5/003 |

OTHER PUBLICATIONS

LG Electronics: "Discussion on NR-L TE coexistence", 3GPP Oraft; R1-1702504 NR-L TE Coexistence, Brogeneration Partnership Project (3GPP), Mobile Competence Centre; 650, Route Oes Lucioles; F-06921 Sophia-Antipolis Ceoex; France, vol. RAN WG1, No. Athens, Greece; Feb. 13, 2017-Feb. 17, 2017 Feb. 12, 2017 (Feb. 12, 2017), XP051209658, Retrieved from the Internet:URL:http://www.3gpp.orglftp/Meetings_3GPP_SYNC/RAN1/00cs/, [retrieved on Feb. 12, 2017].

Huawei et al: "Coexistence of NR DL and LTE", 3GPP Draft: R1-1703559 Coexistence of NR DL and L TE R1 3rd Generation Partnership Project (3GPP), Mobile Competence Centre; 650, Route Des Lucioles; F-06921, Sophia-Antipolis Cedex; France, vol. RAN WG1, No. Athens, Greece; Feb. 13, 2017-Feb. 17, 2017 Feb. 15, 2017 (Feb. 15, 2017), XP051222083. Retrieved from the Internet:URL:http://www.3gpp.orglftp/tsg_ran/WG1_RL_1/TSGR1_88/Docs/, [retrieved on Feb. 15, 2017].

Samsung: "L TE-NR Coexistence for DL", 3GPP Draft; R1-1703010 L TE-NR Coexistence for DL_Final, 3rd Generation Partnership Project (3GPP), Mobile Competence Centre; 650, Route Des Lucioles; F-06921, Sophia-Antipolis Cedex; France, vol. RAN WG1, No. Athens, Greece; Feb. 13, 2017-Feb. 17, 2017 Feb. 12, 2017 (Feb. 12, 2017), XP051210151, Retrieved from the Internet:URL:http://www.3gpp.orglftp/Meetings_3GPP_SYNC/RAN1/Docs/, [retrieved on Feb. 12, 2017].

Huawei et al: "Consideration of NR signals and channels mapping around L TE CRS" 3GPP Draft: R1-1700402. 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017 (Jan. 16, 2017), XP051207939, Retrieved from the Internet:URL:http://www.3gpp.orglftp/Meetings_3GPP_SYNC/RAN1/Docs/, [retrieved on Jan. 16, 2017].

Qualcomm Incorporated: "NR L TE Coexistence Considerations", 3GPP Draft; R1-1702651 NR-LTE Coexistence Consideration, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017 (Feb. 12, 2017), XP051209800, Retrieved from the Internet:URL:http://www.3gpp.orglftp/Meetings_3GPP SYNC/RAN1/00cs/, [retrieved on Feb. 12, 2017].

Extended European Search Report dated Aug. 21, 2018, issued in European Application No. 18165392.4.

* cited by examiner

APPARATUS, TERMINAL AND SIGNAL TRANSMITTING AND RECEIVING METHOD THEREOF IN A WIRELESS COMMUNICATION SYSTEM

CROSS-REFERENCE TO RELATED APPLICATION(S)

This application is based on and claims priority under 35 U.S.C. § 119 to Korean Patent Application No. 10-2017-0042198, filed on Mar. 31, 2017 and to Korean Patent Application No. 10-2018-0036849, filed on Mar. 29, 2018, in the Korean Intellectual Property Office, the disclosure of which is incorporated by reference herein in its entirety.

TECHNICAL FIELD

The disclosure relates to a wireless communication system. More particularly, the disclosure relates to a base station and a terminal capable of transmitting and receiving a signal while a first communication system and a second communication system share frequency and time resources.

BACKGROUND

To meet a demand for radio data traffic that is on an increasing trend since commercialization of a $4^{th}$ generation (4G) communication system, efforts to develop an improved $5^{th}$ generation (5G) communication system or a pre-5G communication system have been conducted. For this reason, the 5G communication system or the pre-5G communication system is called a beyond 4G network communication system or a post long term evolution (LTE) system.

To achieve a high data transmission rate, the 5G communication system is considered to be implemented in a super high frequency millimeter wave (mmWave) band. To relieve a path loss of a radio wave and increase a transfer distance of the radio wave in the super high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed.

In addition, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, there is a need for a signal transmitting and receiving method for coexistence of a general wireless communication system (long term evolution (LTE)) and the 5G communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for performing communication using the same frequency and time resources in a general communication system (long term evolution (LTE)) and a 5th generation (5G) communication system.

In accordance with an aspect of the disclosure, the provision of a signal transmitting method of an apparatus in a wireless communication system is provided. The method includes confirming a location of a control signal for a first communication system when a transmission band of the first communication system and a transmission band of a second communication system overlap each other, puncturing a signal for the second communication system at the confirmed location of the control signal for the first communication system, and transmitting the punctured signal for the second communication system.

In accordance with an aspect of the disclosure, the provision of a signal receiving method of a terminal in a wireless communication system in which a transmission band of a first communication system and a transmission band of a second communication system overlap each other is provided. The method includes confirming a location of a punctured resource in the first communication system, receiving a signal for the second communication system, and decoding the received signal based on the confirmed result.

In accordance with an aspect of the disclosure, the provision of an apparatus in a wireless communication system is provided. The apparatus includes a transceiver for transmitting and receiving a signal, and at least one processor configured to confirm a location of a control signal for a first communication system when a transmission band of the first communication system and a transmission band of a second communication system overlap each other, puncture a signal for the second communication system at the confirmed location of the control signal for the first communication system, and control the transceiver to transmit the punctured signal for the second communication system.

In accordance with an aspect of the disclosure, the provision of a terminal in a wireless communication system in which a transmission band of a first communication system and a transmission band of a second communication system overlap each other is provided. The terminal includes a transceiver for transmitting and receiving a signal, and at least one processor configured to confirm a location of a punctured resource in the first communication system, control the transceiver to receive a signal for the second communication system, and decode the received signal based on the confirmed result.

According to the embodiments of the disclosure, communication may be performed using the same frequency and time resources while minimizing occurrence of interference in the general communication system (LTE) and the 5G communication system.

The effects that may be achieved by the embodiments of the disclosure are not limited to the above-mentioned objects. That is, other effects that are not mentioned may be obviously understood by those skilled in the art to which the disclosure pertains from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a diagram illustrating a method for transmitting a signal without affecting a control channel of the LTE and the 5G in the 5G system according to an embodiment of the disclosure;

Throughout the drawings, it should be noted that like reference numbers are used to depict the same or similar elements, features, and structures.

DETAILED DESCRIPTION

Figure 1:
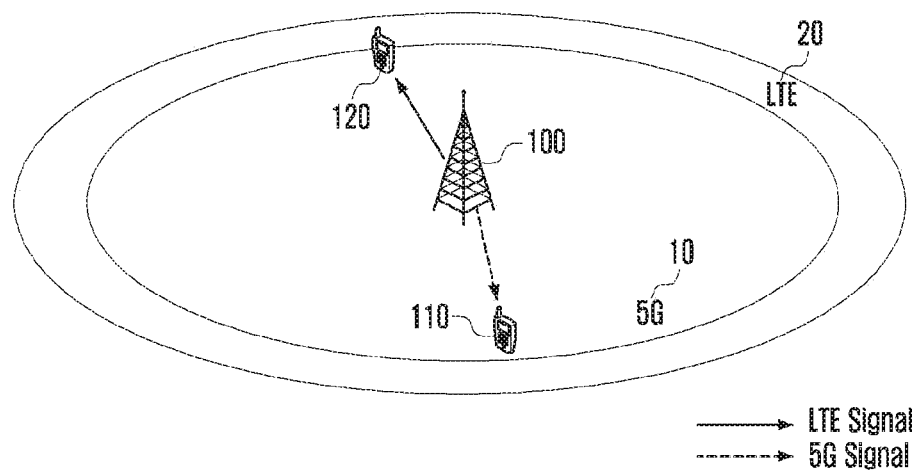
FIG. 1 is a diagram illustrating an embodiment in which one base station supports a first communication system and a second communication system at the same time according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, descriptions for features that are well known in the art to which the disclosure pertains and are not directly related to the disclosure will be omitted. This is to clarify the gist of the disclosure clearly without obscuring it by way of omitting unnecessary descriptions.

For the same reason, some elements are exaggerated, omitted, or schematically illustrated in the accompanying drawings. Further, each element may have a size different from those shown in the drawings. The same reference numerals throughout the drawings denote the same or corresponding element.

Advantages and features of the disclosure and methods to achieve them will be elucidated from embodiments described below in detail with reference to the accompanying drawings. However, the disclosure is not limited to the preferred embodiment disclosed herein but will be implemented in various forms. The preferred embodiments make disclosure of the disclosure thorough and are provided so that those skilled in the art can easily understand the scope of the disclosure. Therefore, the disclosure will be defined by the scope of the appended claims. Like reference numerals throughout the specification denote like elements.

It will be understood that each block in flowcharts and combinations of the flowcharts may be performed via computer program instructions. These computer program instructions may be installed in processors of special computers or other programmable data processing equipment, thus the instructions performed through the processors of the computer or other programmable data processing equipment may generate a means for performing functions described in a block(s) of the flow chart. These computer program instructions may also be stored in a computer-readable memory that may direct a computer or other programmable data processing equipment to implement functions in a particular manner, such that the instructions stored in the computer-readable memory produce an article of manufacture including the instruction means that implements the function described in the block(s) of the flowcharts. The computer program instructions may also be loaded onto a computer or other programmable data processing equipment to cause a series of operations to be performed on the computer or other programmable data processing equipment to produce a process executed by the computer such that the instructions executed on the computer or other programmable data processing equipment may also provide steps for implementing the functions described in the block(s) of the flowcharts.

Further, the respective block may indicate parts of modules, segments, or codes including one or more executable instructions for performing specific logical function(s). Further, it should be noted that the functions mentioned in the blocks may be performed in different order in several alternative embodiments. For example, two blocks illustrated successively may be performed substantially at the same time, or may be performed in reverse order according to their functions.

Here, a term "unit" used in the embodiments of the disclosure means, but is not limited to, a software or hardware element such as a field programmable gate array (FPGA) or application specific integrated circuit (ASIC), which performs certain roles. However, the term "unit" is not limited to software or hardware. A "unit" may be configured to reside on an addressable storage medium or configured to execute one or more processors. Thus, a "unit" may include, for example, elements, such as software elements, object-oriented software elements, class elements and task elements, processes, functions, attributes, procedures, subroutines, segments of a program code, drivers, firmware, microcode, circuitry, data, databases, data structures, tables, arrays, and variables. Functions provided in the elements and the "units" may be combined into fewer elements and "units" or further separated into additional elements and "units". In addition, the elements and "units" may also be implemented such that they execute one or more central processing units (CPUs) in a device or a secure multimedia card.

In the disclosure, a terminal may generally include a mobile terminal, and may indicate a device that is pre-subscribed to a mobile communication system to receive a service from the mobile communication system. The mobile terminal may include smart devices such as a smartphone, a tablet PC, and the like, but this is merely an example and the disclosure is not limited thereto.

FIG. 1 is a diagram illustrating an embodiment in which one base station supports a first communication system and a second communication system at the same time according to an embodiment of the disclosure. Preferably, the first communication system may be a long term evolution (LTE) communication system 20 and the second communication system may be a 5$^{th}$ generation (5G) communication system 10.

Referring to FIG. 1, a base station 100 may support a 5G terminal 110 and an LTE terminal 120 by using the same band.

Figure 2:
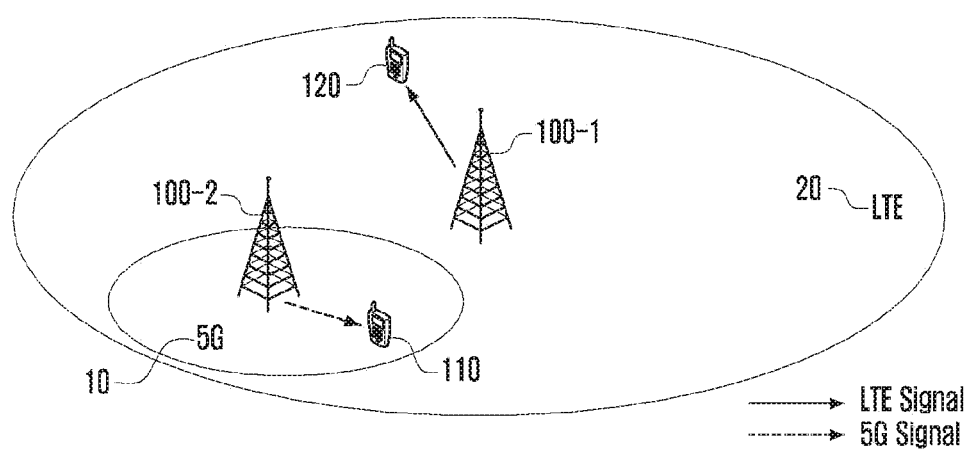
FIG. 2 is a diagram illustrating an embodiment in which different base stations support the first communication system and the second communication system, respectively according to an embodiment of the disclosure.

FIG. 2 is a diagram illustrating an embodiment in which different base stations support the first communication system and the second communication system, respectively according to an embodiment of the disclosure. Even in FIG. 2, the first communication system may be the LTE communication system 20 and the second communication system may be the 5G communication system 10.

Referring to FIG. 2, a first base station 100-1 which is a next-generation base station evolved node B, hereinafter, referred to as (ENB), node B, or base station) in a radio access network of the LTE system may support an LTE user terminal (user equipment, hereinafter, referred to as UE or terminal) 120. The first base station 100-1 corresponds to an existing Node B of a universal mobile telecommunication system (UMTS) system. An ENB is connected with the UE 120 over a wireless channel, and performs a role more complicated than the existing Node B. In the LTE system, all user traffics including a real time service such as a voice over IP (VoIP) service through an internet protocol are provided through a shared channel, thus an apparatus for scheduling by collecting state information such as a buffer state, an available transmission power state, a channel state, and the like of UEs is needed, and the first base station 100-1 serves as the apparatus. One ENB generally controls a plurality of cells. For example, in order to implement a transmission rate of 100 Mbps, the LTE system uses an orthogonal frequency division multiplexing (hereinafter, referred to as OFDM) as a wireless access technology in a bandwidth of, for example, 20 MHz. Further, an adaptive modulation & coding (hereinafter, referred to as AMC) scheme of determining a modulation scheme and a channel coding rate according to a channel state of a terminal is applied.

Further, although not illustrated, the LTE system may include a serving gateway (S-GW) and a mobility management entity (MME). The S-GW is a device providing a data bearer, and generates or removes a data bearer according to a control of the MME. The MME is a device serving to perform various control functions in addition to a mobility management function for the terminal, and is connected with a plurality of base stations.

Meanwhile, a second base station 100-2 which is a next-generation base station (new radio node B, hereinafter, referred to as NR gNB or NR base station) 100-2 in a radio access network of a next-generation mobile communication system (hereinafter, new radio (NR) or 5G) may support a 5G user terminal (new radio user equipment, hereinafter, referred to as NR UE, 5G terminal, or terminal) 110. The 5G terminal 110 may access an external network through the second base station 100-2 and a new radio core network (NR CN) (not illustrated).

The second base station 100-2 corresponds to an evolved node B (eNB) of the existing LTE system. The second base station is connected with the NR UE 110 over a radio channel and may provide more excellent service as compared to the existing Node B. In the next-generation mobile communication system, all user traffics are provided through a shared channel, thus an apparatus for scheduling by collecting state information such as a buffer state, an available transmission power state, a channel state, and the like of UEs is needed, and the second base station 100-2 serves as the apparatus. One NR gNB generally controls a plurality of cells. In order to implement ultra high-speed data transmission in comparison to the current LTE, an existing maximum bandwidth or more may be provided, and the OFDM may be used as a wireless access technology and a beamforming technology may be additionally combined therewith. Further, the AMC scheme of determining a modulation scheme and a channel coding rate according to a channel state of a terminal is applied. The NR CN performs a function such as mobility support, bearer configuration, and quality of service (QoS) configuration. The NR CN is a device serving to perform various control functions in addition to a mobility management function for the terminal, and is connected with a plurality of base stations. Further, the next-generation mobile communication system may interwork with the existing LTE system, and the NR CN is connected with the MME of the LTE system through a network interface. The MME is connected with the first base station 100-1 which is a base station of the LTE system.

The embodiment described in the disclosure may be applied to both of a case in which one base station supports the LTE communication system and the 5G communication system at the same time as illustrated in FIGS. 1 and 2, and a case in which different base stations support the LTE communication system and the 5G communication system, respectively.

Specifically, the 5G system is under standardization to provide a higher data rate and higher reliability as compared to the existing LTE system. The 5G system is a system supporting much more various services by supporting broadband and applying multi-numerology. As a basic waveform of the 5G system, a cyclic prefix orthogonal frequency division multiplexing (CP-OFDM) which is the same waveform as that of the existing LTE has been adopted, and accordingly, the 5G system is under standardization so as to have a similar frame structure to that of the LTE.

The disclosure relates to a coexistence method in which a frequency/time resource of the LTE is used together in the 5G system, and an apparatus therefor. Specifically, the disclosure describes a method in which a frequency band supporting the LTE supports the new 5G system at the same time and a bandwidth (BW) resource is reused by utilizing frequency refarming, or the like.

In LTE, a common reference signal (CRS) is used as a downlink signal to determine characteristics of a channel. The base station transmits the CRS to the LTE band except for a specific situation such as a multicast-broadcast single-frequency network (MBSFN) subframe or an uplink subframe in a time duplex division (TDD). The terminal may measure a quality and a characteristic of a channel using the transmitted CRS, and may use the CRS when estimating a channel value to detect transmission data. When the CRS is not transmitted in a normal subframe, the terminal may commit a measurement error, thus the LTE base station needs to transmit the CRS to every subframe. Further, in LTE, a control signal is transmitted while being allocated to front symbols of each subframe, and a data signal is transmitted while being allocated to a specific frequency resource after the front symbols.

The 5G system has adopted the same CP-OFDM as in the LTE for resource utilization. When the LTE and the 5G system support the same subcarrier spacing, the 5G system supports a frame having the same time alignment as that of the LTE.

The disclosure suggests a method of using the 5G system together with the LTE system band in order to provide the LTE service as it is without discontinuing the LTE service. Specifically, when a 5G signal is allocated to the LTE system band as it is, a CRS and control signals transmitted in the LTE at all times and the 5G signal may collide with each other to thereby interfere with each other. As the interference occurs, the CRS of the LTE may be distorted due to the data signal of the 5G system, such that it may be difficult to measure a quality of the LTE channel. Therefore, the disclosure suggests a signal transmitting and receiving method and structure for effective coexistence of the LTE system and the 5G system without interference.

Figure 3:
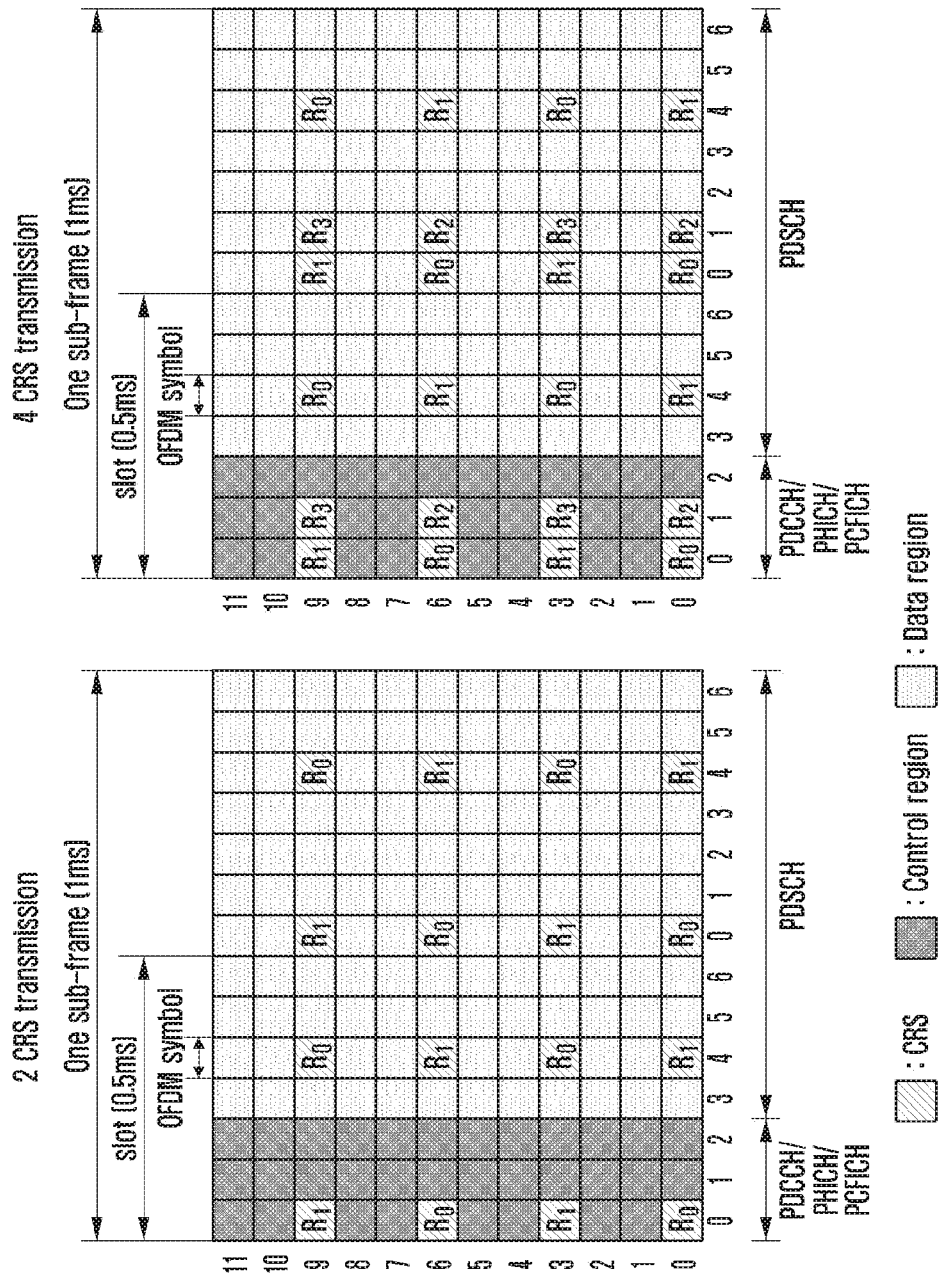
FIG. 3 is a diagram illustrating a structure of a downlink subframe in a case of normal cyclic prefix (CP) in long term evolution (LTE) according to an embodiment of the disclosure.

FIG. 3 is a diagram illustrating a downlink subframe structure of LTE in a case of normal cyclic prefix (CP) according to an embodiment of the disclosure. One subframe is configured to two slots, and one slot includes 7 OFDM symbols. The terminal requires channel information to measure a quality of a channel or detect a reception signal, and the base station may transmit a CRS which is a reference signal that a transmitter and a receiver know in advance to measure a quality of the channel, or the like.

Referring to FIG. 3, the CRS may be transmitted to up to four ports. In the case of normal CP, CRS ports 0 and 1 are arranged in 0-th, 4-th, 7-th, and 11-th symbols on a time axis, and CRS ports 2 and 3 are arranged in 1-th and 8-th symbols (in a case of extended CP, CRS ports 0 and 1 are arranged in 0-th, 3-th, 6-th, and 9-th symbols, and CRS ports 2 and 3 are arranged in 1-th and 7-th symbols). On a frequency axis, the CRS ports are arranged in an entire system band at an interval of 6 tones, and arranged by moving along the frequency axis according to $v_{shift}$ (=cell ID mod 6). FIG. 3 is a diagram illustrating an embodiment in a case in which $v_{shift}$=0. Control channels such as a physical downlink control channel (PDCCH), a physical hybrid automatic repeat request indicator channel (PHICH), and a physical control format indicator channel (PCFICH) may be allocated to front three symbols of a first slot, in order to transmit control information. The PCFICH and the PHICH are allocated to a specific resource in a control symbol to be transmitted, and a location of the resource may be changed according to a cell ID and the number of CRS. However, once a cell ID and the number of CRS are determined, they are not changed, thus a location of a resource is not changed over time. The PDCCH is transmitted in the remaining control symbol resource, and a location of the resource may be changed over time according to a radio network temporary identity (RNTI) of a specific user. A physical downlink shared channel (PDSCH) for data transmission may be allocated to symbols after the control symbols.

In order to prevent trouble from occurring when the LTE terminal performs channel measurement and receives a control signal, the LTE control signal and the CRS need to be transmitted in the LTE system band. In other words, even when a resource the 5G intends to use is within the system band of the LTE, the control signal and the CRS of the LTE need to be transmitted. Therefore, the disclosure suggests a method for effectively transmitting and receiving a 5G signal while preventing trouble from occurring at the time of LTE signal transmission.

Figure 4A:
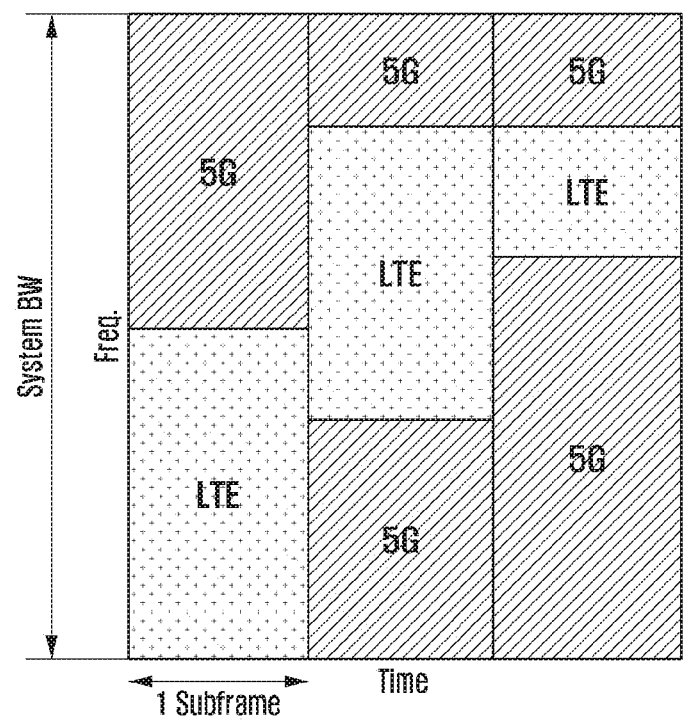
FIGS. 4A and 4B are diagrams illustrating a structure of a structure for transmitting $5^{th}$ generation (5G) data according to an embodiment of the disclosure.
Figure 4B:
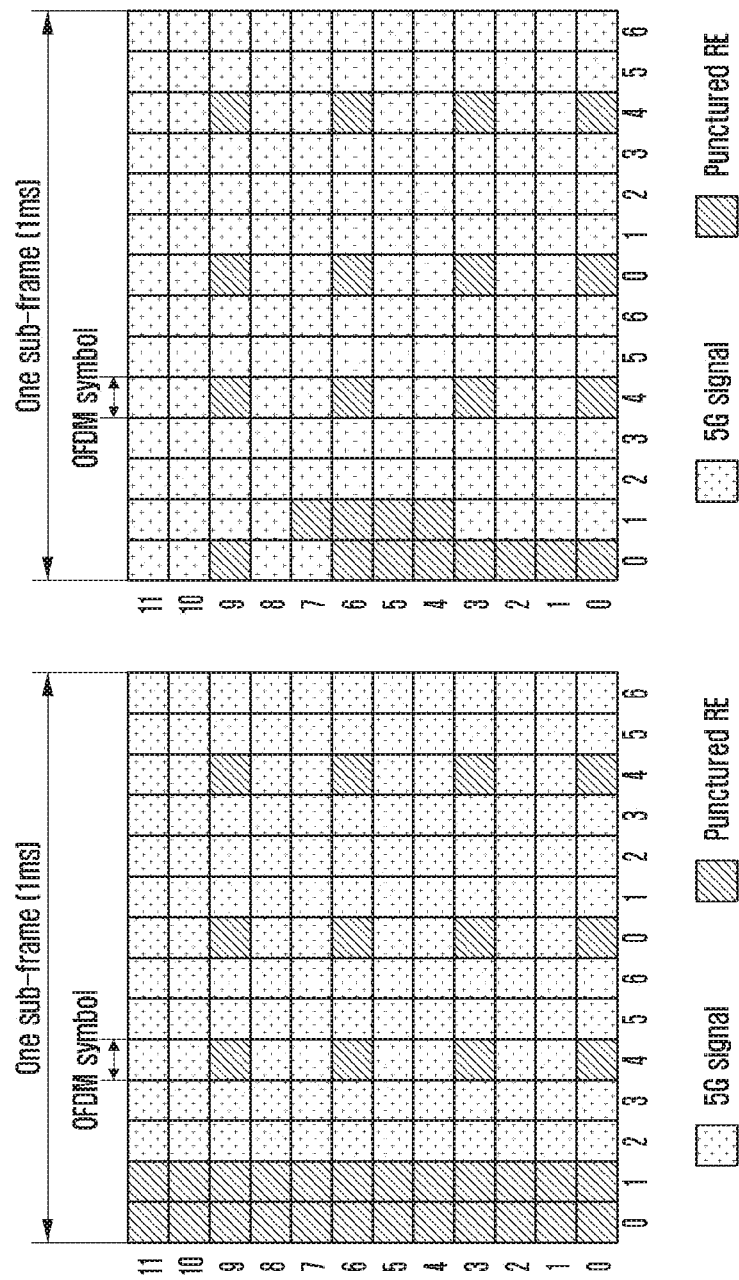

First, FIGS. 4A and 4B are diagrams illustrating a structure of a structure for transmitting 5G data according to an embodiment of the disclosure.

Referring to FIG. 4A, a diagram illustrating an example in which a frequency and a resource are flexibly allocated for efficient coexistence of the LTE system and the 5G system. Specifically, as illustrated in FIG. 4A, the LTE system and the 5G system may share and use a resource in an entire system band. Further, resources may be dynamically divided and used according to a channel state of a user of each system in a subframe unit. However, the embodiment illustrated in FIG. 4A is merely an embodiment of the disclosure, and does not limit the scope of the disclosure.

Referring to FIG. 4B, a diagram specifically illustrating an embodiment in which puncturing is performed on a signal for the second communication system based on a location of a control signal for the first communication system.

First, a cell performing 5G communication determines a signal that needs to be transmitted like a CRS in a corresponding subframe of a cell performing LTE communications, and determine a location where the determined signal and a 5G signal overlap each other. Then, the determined overlapping location may be punctured to map the 5G signal to the resource. Thereafter, a 5G base station may transmit the 5G signal mapped to a downlink subframe to a terminal. As illustrated in FIG. 4B, a punctured resource element (RE) may be an RE overlapping a location of a CRS and a control signal of the LTE.

As illustrated in (a) of FIG. 4B, when a location of a specific RE in which a control signal is transmitted is difficult to be determined by a 5G cell, the 5G cell may puncture all 5G signals that need to be transmitted to a symbol to which the control signal is allocated. As illustrated in (b) of FIG. 4B, when the 5G cell may receive information on a location of an LTE control signal or calculate the location of the LTE control signal through cooperation with an LTE cell, the 5G cell may puncture only a specific RE, rather than puncturing all symbols in which the control signal is transmitted. For example, in the case of PCFICH and PHICH, since a location of a resource is determined according to a cell ID and the number of CRS, the 5G cell receives the cell ID and the number of CRS from the LTE cell to determine a location of a specific control signal being used by the LTE cell, thereby determining an RE to be punctured of a 5G signal.

As illustrated in FIG. 4B, the punctured 5G signal may be a data channel, and may also be a 5G control channel. Further, the punctured 5G signal may also be reference signals transmitted in 5G.

As described above, when one base station supports a cell performing the 5G communication and a cell performing the LTE communication at the same time, information on a location of an RE for a signal essentially transmitted in the LTE communication system may be easily acquired.

Further, when different base stations support a cell performing the 5G communication and a cell performing the LTE communication, respectively, necessary information may be transmitted and received through an X2 interference between the 5G base station and the LTE base station, or necessary information may be acquired by tracking an LTE signal by the 5G base station. The 5G base station acquiring the information may puncture an RE at a specific location according to the description described with reference to FIGS. 4A and 4B, and transmit the punctured 5G signal.

Figure 5:
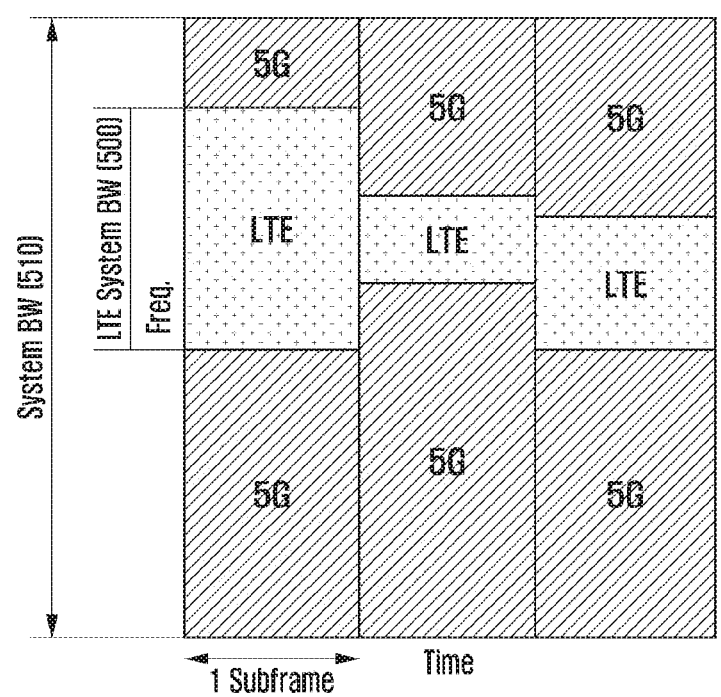
FIG. 5 is a diagram illustrating a structure of a subframe for transmitting LTE and 5G data when a system bandwidth and a center frequency of the LTE and a system bandwidth and a center frequency of the 5G are different from each other, according to an embodiment of the disclosure.

FIG. 5 is a diagram illustrating a structure of a subframe for transmitting LTE and 5G data when a system bandwidth and a center frequency of the LTE and a system bandwidth and a center frequency of the 5G are different from each other, according to an embodiment of the disclosure.

Specifically, FIG. 5 is a diagram illustrating an embodiment in a case in which a bandwidth 500 of the LTE communication system is included in a bandwidth 510 of the 5G communication system.

At this time, in a bandwidth overlapping the bandwidth 500 of the LTE communication system, the 5G base station may perform puncturing as described above with respect to the 5G signal and transmit the punctured 5G signal, in order not to cause interference with the CRS and the control signal of the LTE. Further, in a bandwidth not overlapping the bandwidth 500 of the LTE communication system, the 5G signal may be transmitted without considering the LTE signal.

Further, even in the bandwidth overlapping the bandwidth 500 of the LTE communication system, with respect to a resource region in which the LTE signal is not scheduled, the 5G signal may be transmitted without considering the LTE signal.

Figure 6:
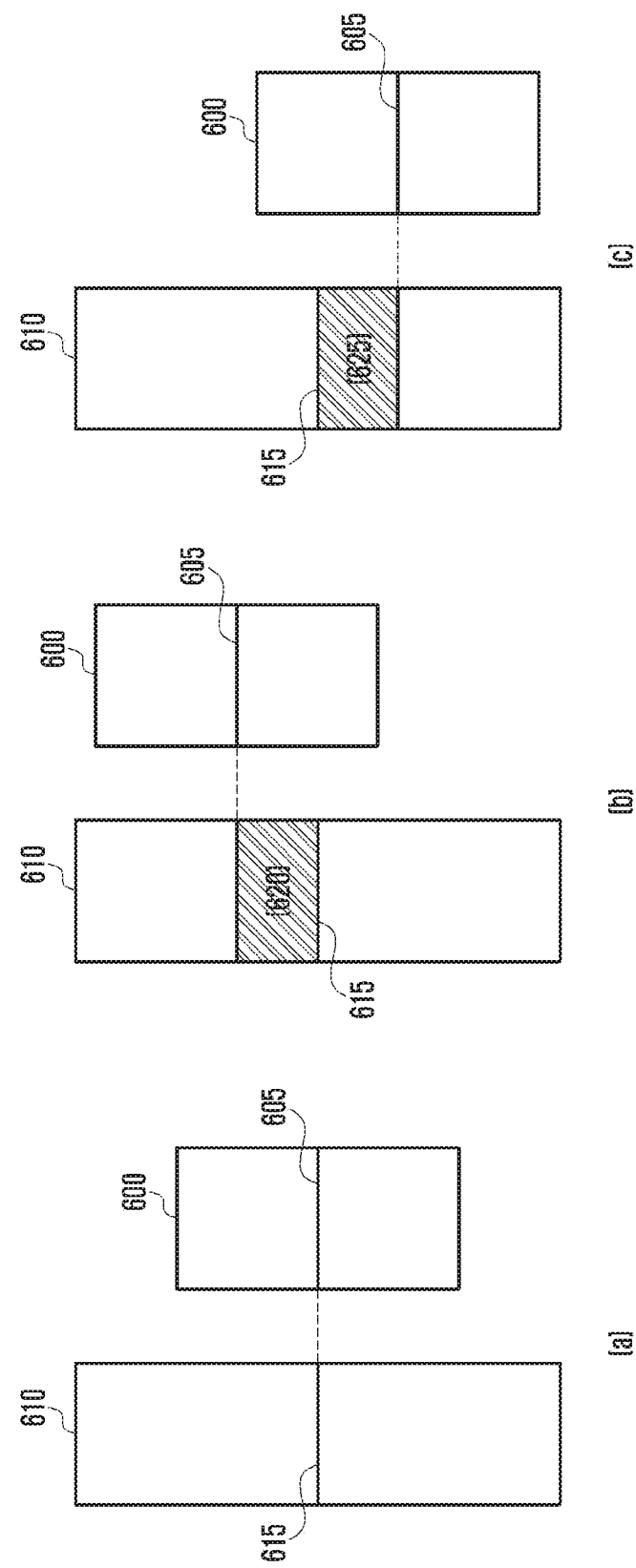
FIGS. 6 and 7 are diagrams illustrating an embodiment in which a puncturing location is adjusted according to a location of a center frequency of the LTE and the 5G when a resource is not allocated to a location of a direct current (DC) subcarrier in the 5G system according to an embodiment of the disclosure.

FIG. 6 is a diagram illustrating an embodiment in which a puncturing location is adjusted according to a location of a center frequency of the LTE and the 5G when a resource is not allocated to a location of a direct current (DC) subcarrier in the 5G system according to an embodiment of the disclosure. The DC subcarrier may be a subcarrier located in the center frequency in an allocable frequency bandwidth.

Referring to FIG. 6, a signal is not transmitted in the location of the DC subcarrier. Specifically, the location of the DC subcarrier is not shown at the time of resource allocation, but a resource is allocated while emptying 1 RE of the center frequency.

Therefore, the 5G base station according to an embodiment of the disclosure may first check where a DC subcarrier 605 of the LTE is located in an LTE bandwidth 600 based on a center frequency 615 of a 5G bandwidth 610. Then, the 5G base station may adjust a location of a resource affected by the location of the DC subcarrier 605 of the LTE to perform puncturing.

The location of the puncturing may be adjusted as illustrated in FIG. 5 according to the location of the DC subcarrier in the 5G communication system. Specifically, as illustrated in (a) of FIG. 6, even though a bandwidth of the LTE system and a bandwidth of the 5G system are different from each other, when a center frequency of the LTE system and a center frequency of the 5G system are the same as each other, since the locations of the DC subcarriers are the same as each other, the location of the DC subcarrier needs not be separately considered.

Meanwhile, as illustrated in (b) and (c) of FIG. 6, when a center frequency of the LTE system and a center frequency of the 5G system are different from each other, a location of a 5G resource 620, 625 between the center frequency of the LTE and the center frequency of the 5G may be adjusted and punctured by considering the location of the DC subcarrier 605 of the LTE. Specifically, as illustrated in (b) of FIG. 6, when the center frequency or the DC subcarrier 605 of the LTE is higher than the center frequency 615 of the 5G the 5G base station may perform puncturing by moving by −1 RE from the RE determined to be punctured as described in FIG. 4. On the other hands, as illustrated in (c) of FIG. 6, when the center frequency or the DC subcarrier 605 of the LTE is lower than the center frequency 615 of the 5G the 5G base station may perform puncturing by moving by +1 RE from the RE determined to be punctured as described in FIG. 4. Additionally, when an LTE signal is allocated in a resource requiring adjustment of a puncturing location, the resource may partially overlap, thus puncturing of a specific subcarrier signal may be needed.

Figure 7:
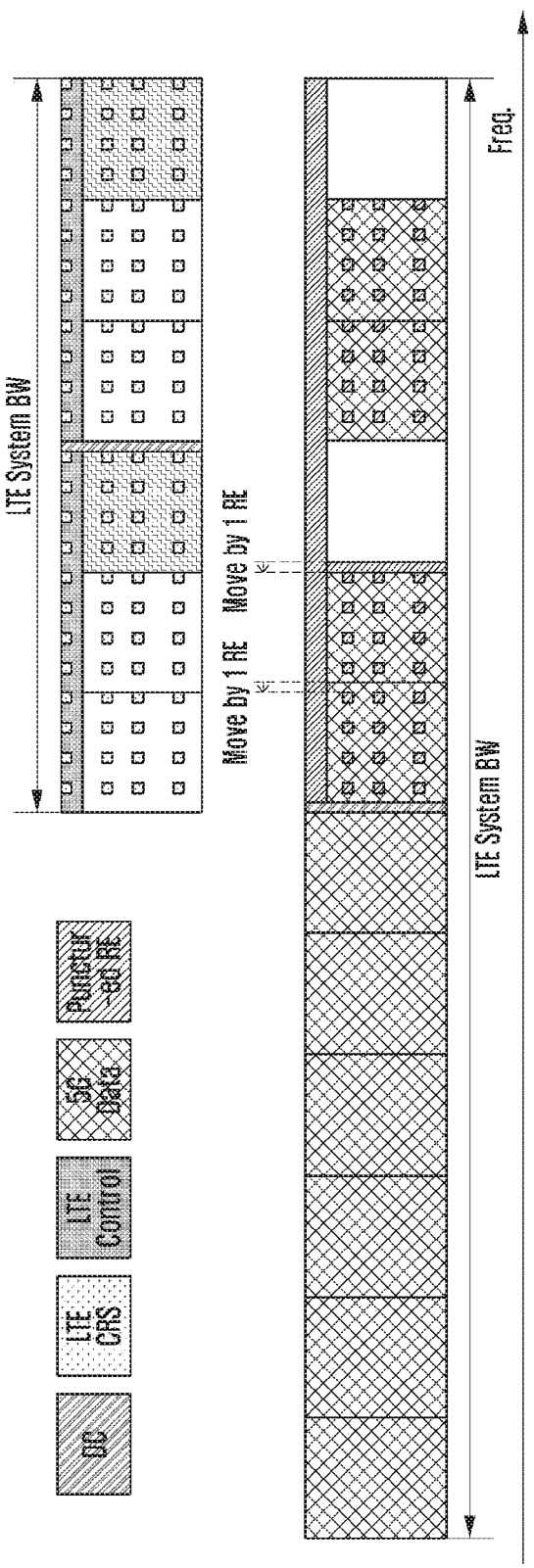

FIG. 7 illustrates an embodiment in which adjustment of a puncturing location is performed by considering a location of a DC subcarrier according to the disclosure. The location of the DC subcarrier of the LTE and the 5G is not shown at the time of RE allocation, but for convenience of understanding, the location of the DC subcarrier is indicated in FIG. 7.

Referring to FIG. 7, a puncturing location is adjusted in a resource between the center frequencies, and a signal may be transmitted based on the punctured location.

Figure 8:
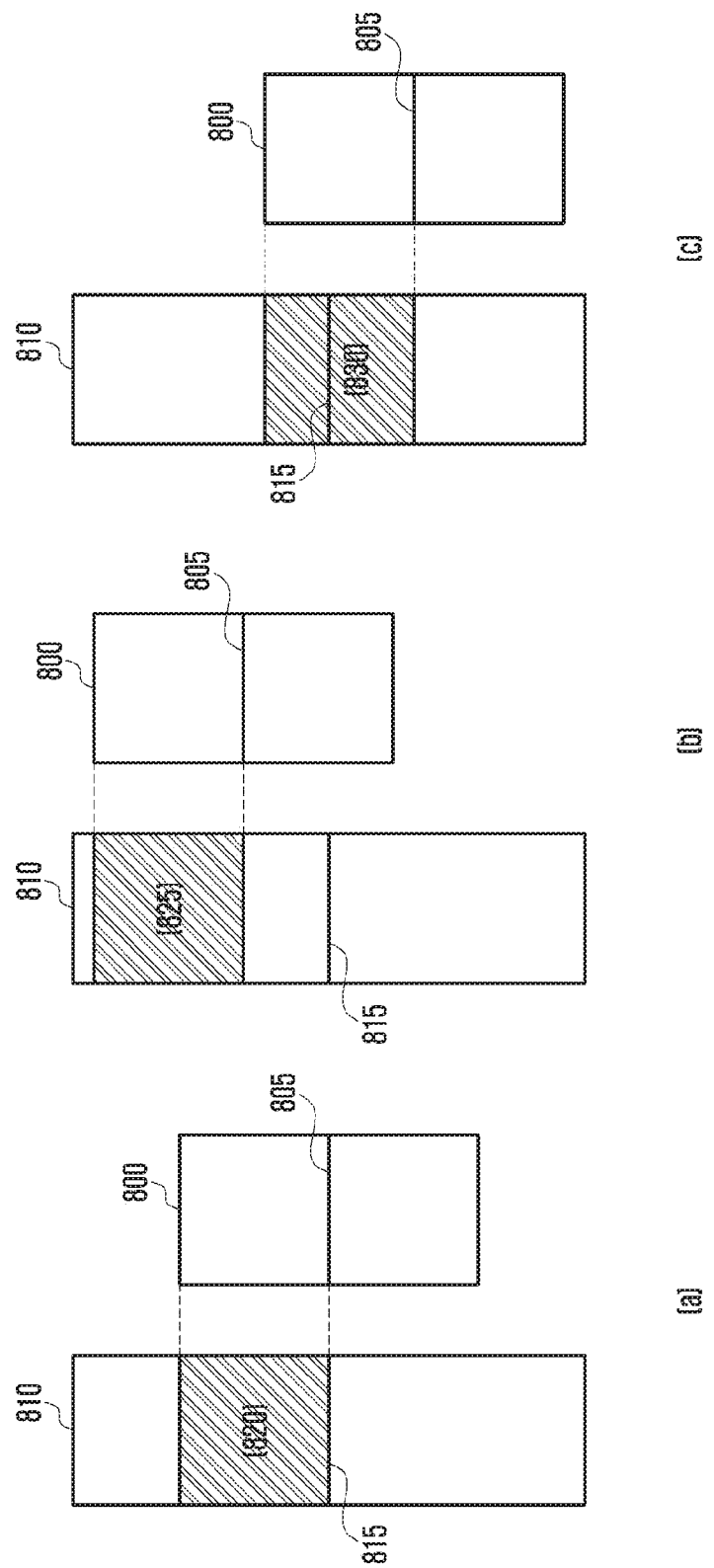
FIGS. 8 and 9 are diagrams illustrating an embodiment in which a puncturing location is adjusted according to a location of a DC subcarrier when a resource is allocated to the location of the DC subcarrier in the 5G system according to an embodiment of the disclosure.

FIG. 8 is a diagram illustrating an embodiment in which a puncturing location is adjusted according to a location of a DC subcarrier when a resource is allocated to the location of the DC subcarrier in the 5G system according to an embodiment of the disclosure.

Since the DC subcarrier excluded in resource allocation is located in the center frequency of the LTE system, 1 RE mismatch between the 5G system and LTE system occurs from resources after the DC subcarrier. Therefore, the 5G base station may perform puncturing by moving by 1 RE with respect to resources after the location of the DC subcarrier of the LTE.

Specifically, object (a) in FIG. 8 illustrates a case in which a bandwidth 800 of the LTE system and a bandwidth 810 of the 5G system are different from each other, and a center frequency 805 of the LTE system and a center frequency 815 of the 5G system are the same as each other. At this time, even though locations of DC subcarriers are the same as each other, in the 5G system, a resource may be allocated to the DC subcarrier, unlike the LTE system. Accordingly, the 5G base station needs to adjust a puncturing location in a resource region 820 between a location of the center frequency 815 of the 5G system and a boundary of the bandwidth 800 of the LTE system.

Further, as illustrated in object (b) in FIG. 8, when the center frequency 805 of the LTE system is higher than the center frequency 815 of the 5G system, the 5G base station needs to adjust a puncturing location in a resource region 825 between a location of the center frequency 805 of the LTE system and a boundary of the bandwidth 800 of the LTE system.

Further, as illustrated in object (c) in FIG. 8, even when the center frequency 805 of the LTE system is lower than the center frequency 815 of the 5G system, the 5G base station needs to adjust a puncturing location in the resource region 830 between a location of the center frequency 805 of the LTE system and a boundary of the bandwidth 800 of the LTE system.

Figure 9:
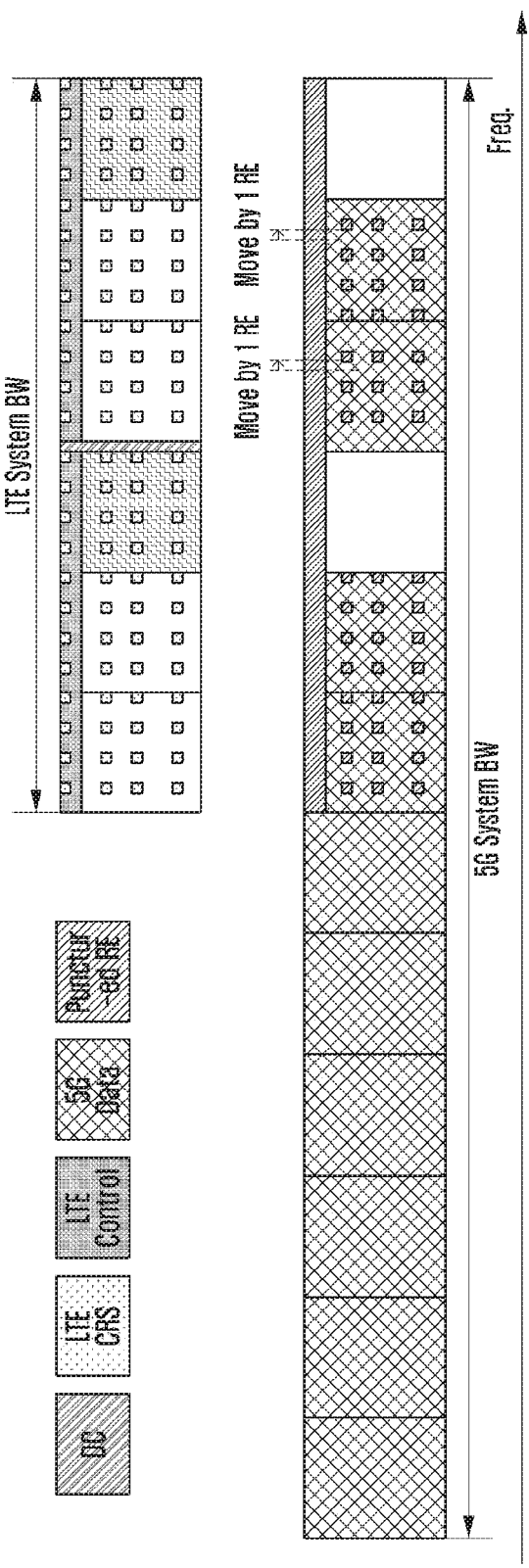

FIG. 9 specifically illustrates an embodiment in which adjustment of a puncturing location is performed by considering a location of a DC carrier of the LTE suggested in the disclosure when a resource is allocated to a location of a DC subcarrier in the 5G system according to an embodiment of the disclosure.

Referring to FIG. 9, a puncturing location is adjusted after the location of the DC subcarrier in the center frequency of the LTE, and a signal may be transmitted based on the punctured location.

Figure 10:
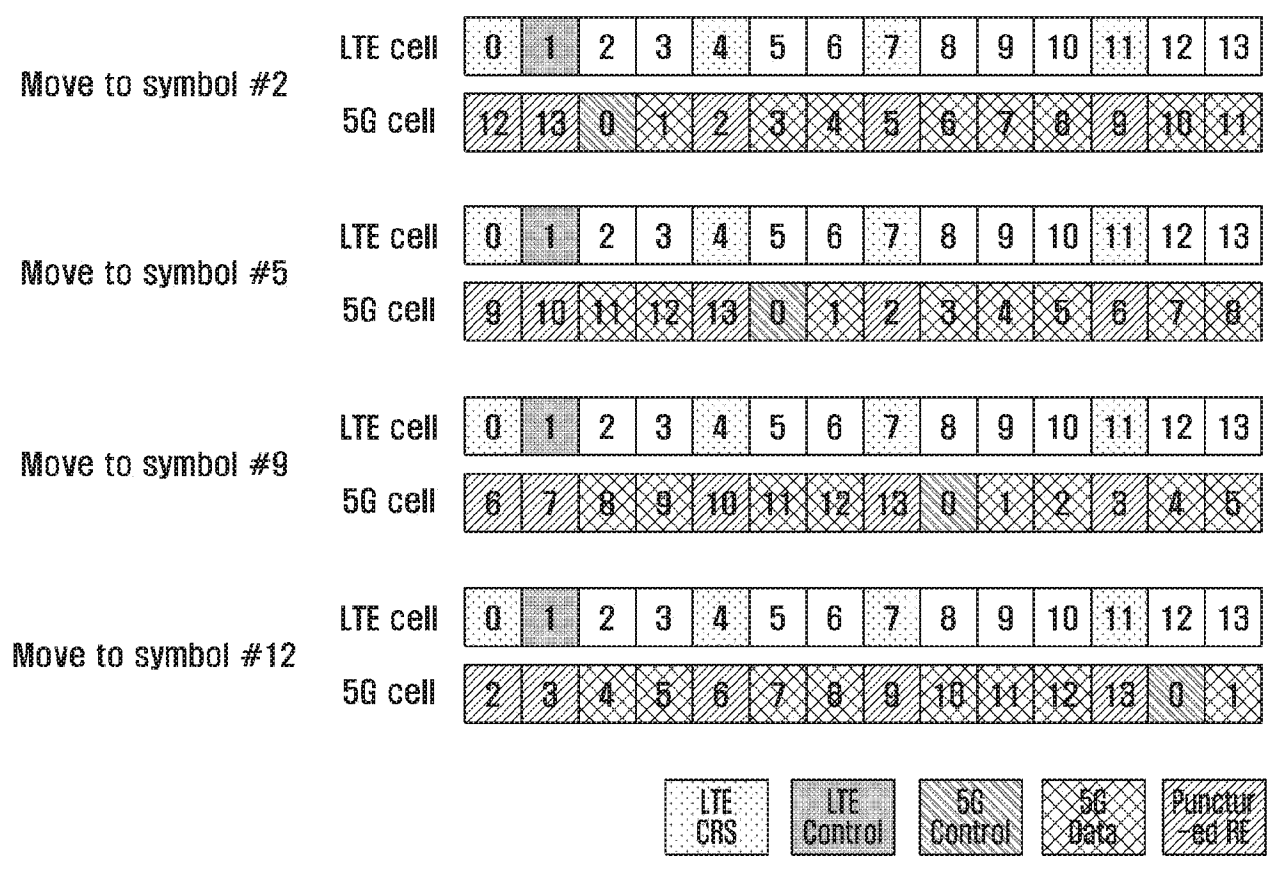

FIG. 10 is a diagram illustrating a method for transmitting a signal without affecting a control channel of the LTE and the 5G in the 5G system according to an embodiment of the disclosure.

Specifically, in the LTE system, a control signal is transmitted in front symbols in a subframe. For example, in the LTE system, the control signal may be transmitted in first to third subframes of a subframe. In the 5G system, a control signal may be transmitted in front symbols in a subframe like the existing LTE, and a method in which a control signal is transmitted in any specific symbol or is transmitted dividedly from a data signal using frequency division multiplexing (FDM).

FIG. 10 is a diagram illustrating an embodiment in which a control signal is transmitted by configuring a symbol offset so that a location of the control signal in a subframe is changed when an amount of interference of an LTE signal is too large when the control signal is transmitted in front symbols in the subframe in the 5G system. Specifically, as illustrated in FIG. 10, a boundary of a subframe of the 5G system may be configured to be located after several OFDM symbols, unlike the LTE system. Further, in the 5G system, an RE overlapping symbols in which a control signal is transmitted in the LTE system may be determined. The 5G base station performs puncturing on the determined RE overlapping symbols in which a control signal is transmitted in the LTE system, thereby transmitting a 5G signal without interfering with the LTE system.

As illustrated in FIG. 10, a case in which CRS transmission symbols of the LTE system are symbols #0, #4, #7, and #11, and a symbol #1 is used as a control symbol is described by way of example. The 5G base station may configure a symbol offset so that a 5G control signal is transmitted from an OFDM symbol #3 of the LTE system in which the CRS of the LTE system is not transmitted. Alternatively, the 5G base station may configure a symbol offset so that a 5G control signal is transmitted from an OFDM symbol #5, a symbol after the symbol #4 which is the second CRS transmission symbol. Similarly, the 5G base station may configure a symbol offset so that a 5G control signal is transmitted from an OFDM symbol #8 or #12, a symbol after the symbol #7 or #11 which is the third CRS transmission symbol or the fourth CRS transmission symbol.

Then, the 5G base station may determine a 5G resource overlapping the CRS and the control signal of the LTE system by considering the symbol for which the symbol offset is configured, and then perform puncturing on the determined symbol.

When the control signal is transmitted using the FDM in the 5G system, the above-described puncturing technique may be applied to the 5G control signal as well.

Meanwhile, the 5G base station may determine the puncturing location as described above by using information shown in Table 1. The 5G base station may receive or estimate the corresponding information by various methods. For example, the information may be information that is hardly changed once it is determined in a setup situation of the LTE communication system, except for the number of control symbols. Accordingly, the information may be acquired by decoding an LTE signal by the 5G base station. Alternatively, the 5G base station may also receive the information from the LTE base station through an X2 interface between the 5G base station and the LTE base station.

TABLE 1

| Location | Required Information |
| --- | --- |
| Location of CRS | The Number of CRS Port |
| | CRS v_shift |
| | LTE Bandwidth |
| Location of Control Signal | The Number of Control Symbol |
| | LTE Bandwidth |
| | (Option) Cell ID |
| | (Option) PDCCH Resource Location |
| Location of DC | Center Frequency of LTE |
| Location of Data | Data Resource Index to be used in LTE |

Figure 11:
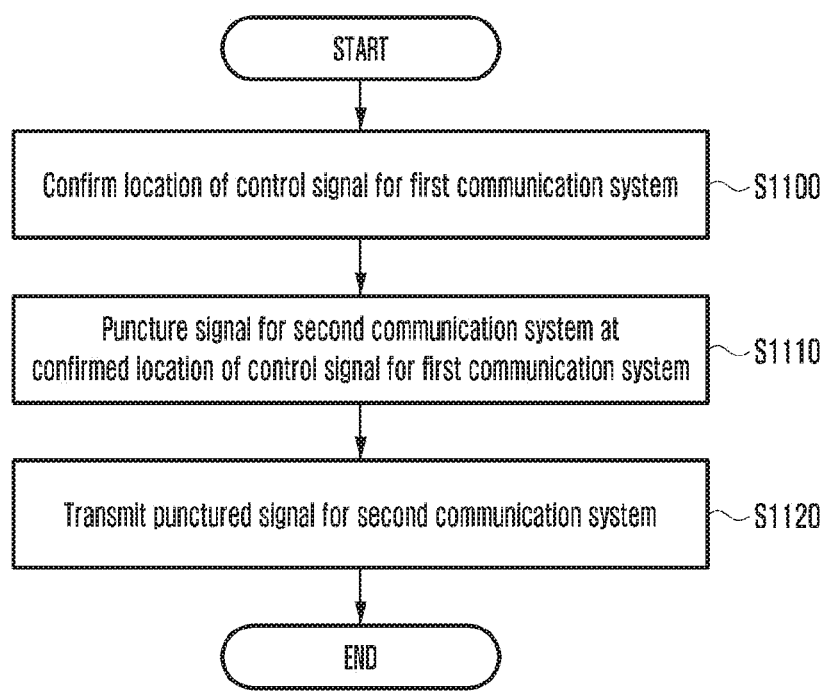
FIG. 11 is a flowchart illustrating a signal transmitting and receiving method of a base station according to an embodiment of the disclosure.

FIG. 11 is a flowchart illustrating a signal transmitting and receiving method of a base station according to an embodiment of the disclosure.

Referring to FIG. 11, an operation of the base station will be described. First, at operation S1100, the base station may confirm a location of a control signal for a first communication system. The first communication system may be the LTE communication system. The base station may confirm a scheduling location of the control signal by acquiring the information as described in Table 1.

Specifically, as described in FIG. 1, when the base station is a base station supporting both of the 5G system and the LTE system, the base station may know the information shown in the above Table 1. Therefore, the base station may confirm the scheduling location of the control signal without receiving separate information from the outside.

On the other hand, as described in FIG. 2, when different base stations support the 5G system and the LTE system, respectively, the base station is a 5G base station and may receive necessary information from the LTE base station through an X2 interface between the base stations. Alternatively, the 5G base station may acquire necessary information by tracking an LTE signal.

Then, at operation S1110, the base station may puncture a signal for a second communication system at the confirmed location of the control signal for the first communication system. The second communication system may be the 5G communication system. The base station may puncture a 5G signal at the confirmed location of the control signal to map the 5G signal.

At operation S1120, the base station may transmit the punctured signal for the second communication system. For example, the base station may transmit the punctured 5G signal to the terminal.

Figure 12:
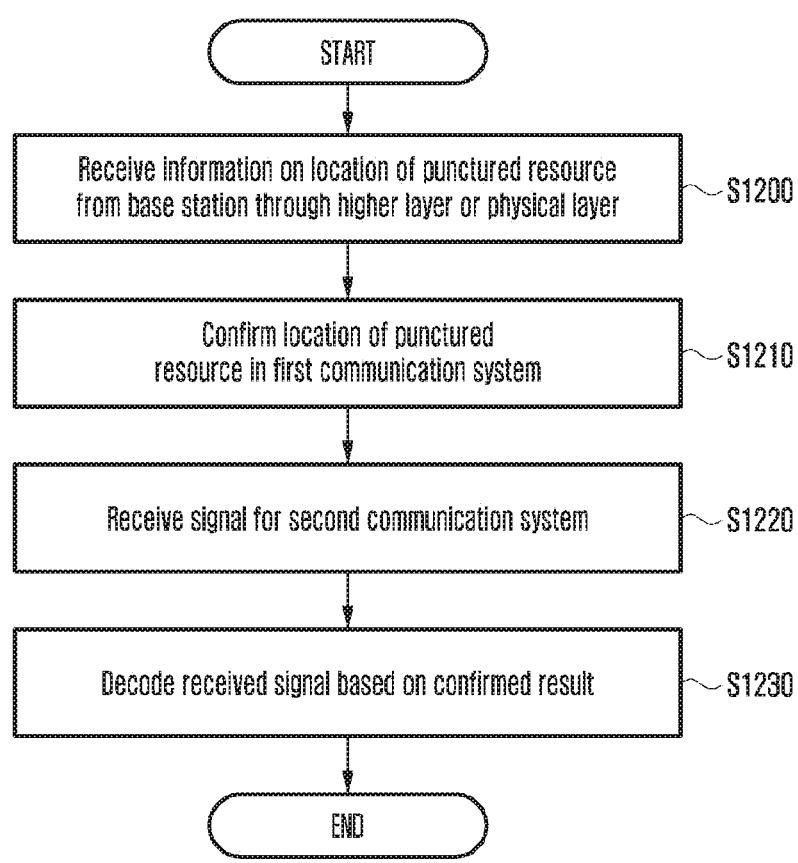
FIG. 12 is a flowchart illustrating a signal transmitting and receiving method of a terminal according to an embodiment of the disclosure.

FIG. 12 is a flowchart illustrating a signal transmitting and receiving method of a terminal according to an embodiment of the disclosure.

Meanwhile, an operation of the terminal according to an embodiment of the disclosure is as illustrated in FIG. 12.

Referring to FIG. 12, at operation S1200 the terminal may receive information on a location of a punctured resource from a base station through a higher layer or a physical layer. For example, the terminal may receive information on a location of a punctured resource from a 5G base station as pattern information.

At operation S1210, the terminal may confirm the location of the punctured resource in the first communication system. For example, the terminal may also blindly determine information on a location of a punctured RE by detecting an LTE signal.

At operation S1220, the terminal may receive a signal for the second communication system. For example, the terminal may receive a 5G signal. At operation S1230, the terminal may decode the received signal based on the confirmed result. Specifically, once the 5G signal is received, the terminal may demap the 5G signal based on the information. Further, the terminal may decode the 5G signal.

Meanwhile, in an uplink environment, since the LTE system specifically uses a resource for a terminal (UE-specific), resources used by the LTE system and the 5G system are separated, thereby enabling coexistence of the LTE system and the 5G system.

Figure 13:
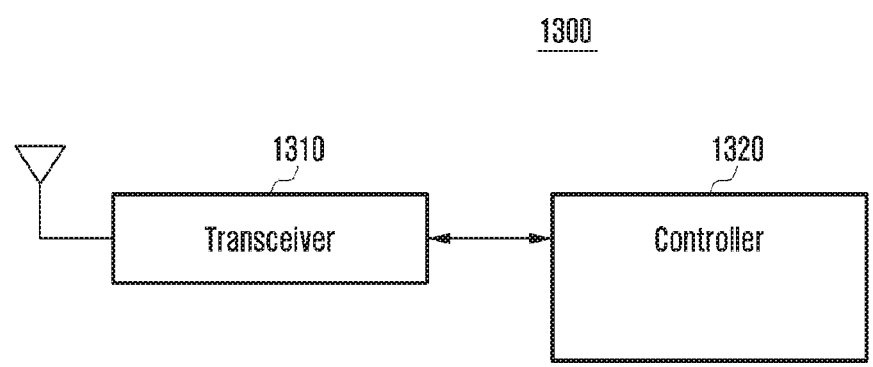
FIG. 13 is a block diagram illustrating components of the base station according to an embodiment of the disclosure.

FIG. 13 is a block diagram illustrating components of the base station according to an embodiment of the disclosure. A base station 1300 may include a transceiver 1310 and a controller 1320.

Referring to FIG. 13, the transceiver 1310 may transmit and receive a signal. For example, the base station 1300 may transmit and receive a signal to and from another base station or a terminal through the transceiver 1310.

The controller 1320 is a component for generally controlling the base station 1300. The controller 1320 may include at least one processor.

The controller 1320 may confirm a location of a control signal for a first communication system when a transmission band of the first communication system and a transmission band of a second communication system overlap each other, puncture a signal for the second communication system at the confirmed location of the control signal for the first communication system, and control the transceiver 1310 to transmit the punctured signal for the second communication system.

At this time, the control signal may include a CRS.

Meanwhile, the controller 1320 may generate information on a location of the punctured resource, and control the transceiver 1310 to transmit the generated information to a terminal.

Further, the controller 1320 may confirm a location of a center frequency of the first communication system and a location of a center frequency of the second communication system, and puncture the signal for the second communication system at the location of the control signal for the first communication system based on the confirmed location of the center frequency of the first communication system and the confirmed location of the center frequency of the second communication system.

Meanwhile, the first communication system may be the LTE communication system and the second communication system may be the 5G communication system.

Further, the controller 1320 may control the transceiver 1310 to receive information on the location of the control signal for the first communication system from a base station supporting the first communication system, when the apparatus is a base station only supporting the second communication system.

Figure 14:
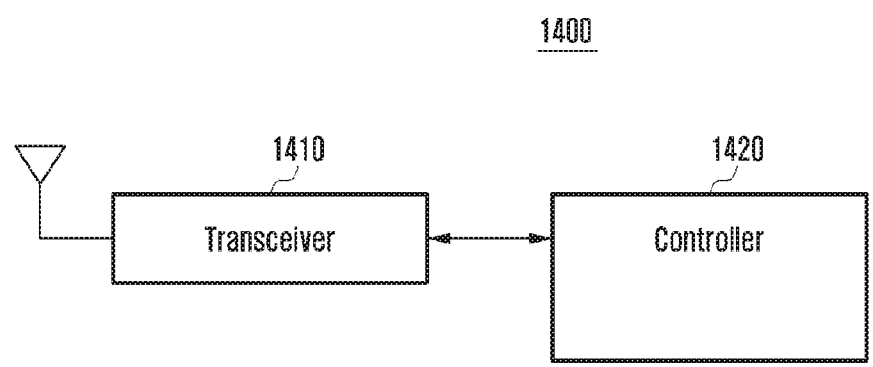
FIG. 14 is a block diagram illustrating components of the terminal according to an embodiment of the disclosure.

FIG. 14 is a block diagram illustrating components of the terminal according to an embodiment of the disclosure. A terminal 1400 may include a transceiver 1410 and a controller 1420.

Referring to FIG. 14, the transceiver 1410 may transmit and receive a signal. For example, the terminal 1400 may transmit and receive a signal to and from a base station or another terminal through the transceiver 1410.

The controller 1420 is a component for generally controlling the terminal 1400. The controller 1420 may include at least one processor.

The controller 1420 may confirm a location of a punctured resource in a first communication system, control the transceiver 1410 to receive a signal for a second communication system, and decode the received signal based on the confirmed result.

Further, the controller 1420 may control the transceiver to receive information on the location of the punctured resource from the base station through a higher layer or a physical layer before confirming the location of the resource.

Further, the controller 1420 may blindly confirm the location of the punctured resource.

Meanwhile, the first communication system may be the LTE communication system and the second communication system may be the 5G communication system.

According to the embodiments of the disclosure as described above, when the method for coexistence of the LTE system and the 5G system is applied, the frequency band supporting the LTE may support the new 5th generation system at the same time, thereby reducing bandwidth resources.

The components of the terminal or the base station described above may be implemented as software. For example, the controller of the terminal or the base station may further include a flash memory or other non-volatile memories. Such non-volatile memory may store a program for performing each role of the controller.

Further, the controller of the terminal or the base station may include a CPU and a random access memory (RAM). The CPU of the controller may copy the above-described programs stored in a non-volatile memory to the RAM, and execute the copied programs to perform a function of the terminal or the base station as described above.

The controller is a component for controlling the terminal or the base station. The controller may be used in the same meaning as a CPU, a microprocessor, a processor, an operating system, or the like. Further, the controller of the terminal or the base station may be implemented as a system-on-a-chip (SOC) or a system on chip (SoC) together with other functional units such as a communication module included in the terminal or the base station, or the like.

Meanwhile, the signal transmitting and receiving method of the terminal or the base station according to various embodiments described above may be coded as software and stored in a non-transitory readable medium. Such non-transitory readable medium may be installed in various apparatuses to be used.

The non-transitory readable medium means a medium that semi-permanently stores data and is readable by a device, not a medium that stores data for a short period of time such as a register, a cache, a memory, or the like. Specifically, the non-transitory readable medium may be a CD, a DVD, a hard disk, a Blu-ray disk, an USB, a memory card, a ROM, or the like.

Figure 15:
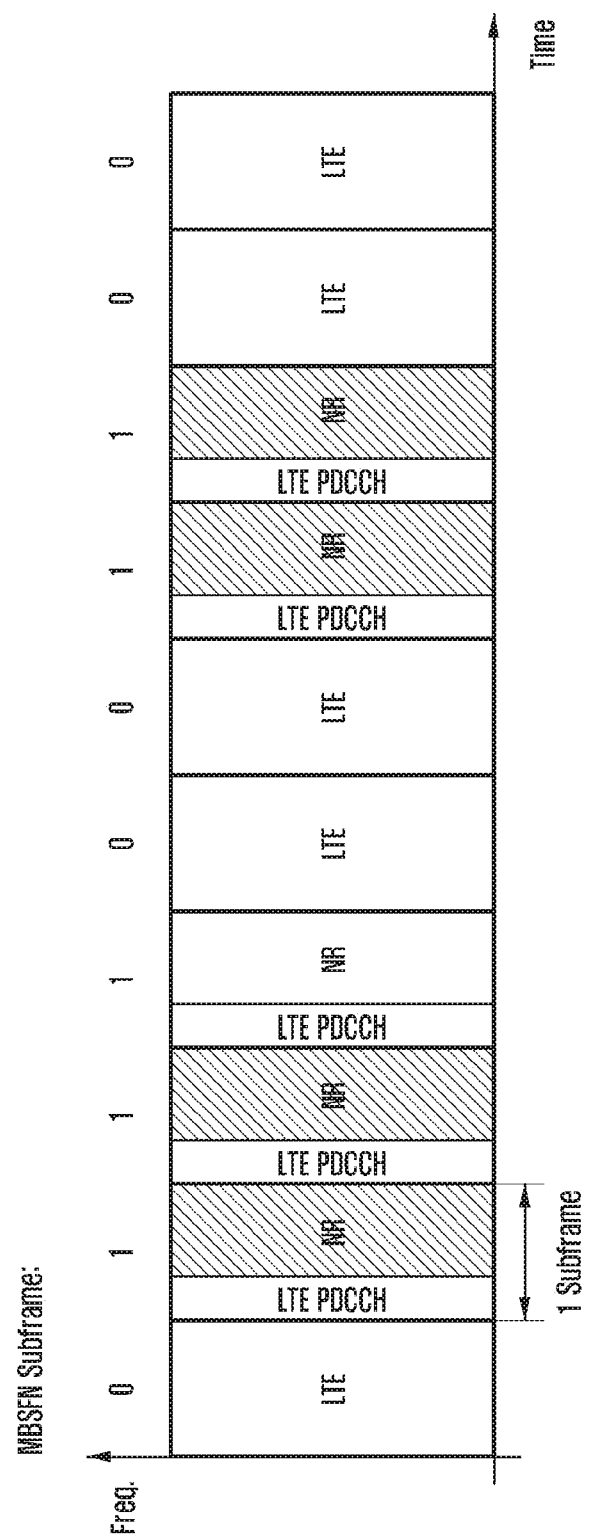
FIG. 15 is a diagram illustrating an embodiment of coexistence of new radio (NR) using a multicast-broadcast single-frequency network (MBSFN) subframe and LTE according to an embodiment of the disclosure.

FIG. 15 is a diagram illustrating an embodiment of coexistence of NR using a MBSFN subframe and LTE according to an embodiment of the disclosure.

Referring to FIG. 15, the NR which is a next generation communication system may be used not only in a high frequency band of 6 GHz or higher, but also in a frequency band of 6 GHz or lower. In this case, since there is not much wide band enough for consecutive use in the frequency band of 6 GHz or lower, a method of using the same band as that used by the existing LTE system may be discussed.

Since a cell specific reference signal (CRS) is always transmitted to every subframe in the LTE, when the NR and the LTE use the same band, the CRS acts as interference with the NR system. To solve this problem, a method in which the NR uses an MBSFN subframe may be considered for coexistence of the LTE and the NR.

The MBSFN subframe in the LTE is divided into a non-MBSFN region and an MBSFN region, in which a control signal and a CRS are transmitted in the non-MBSFN region, and no LTE signal including the CRS is transmitted in the MBSFN region. By allocating an NR signal and channel to the MBSFN region, rather than allocating the LTE signal to the corresponding subframe, the NR and the LTE may be simultaneously supported using the TDM scheme. In the LTE system, up to six MBSFN subframes per 10 ms may be configured in FDD, and up to five MBSFN subframes per 10 ms may be configured in TDD.

FIG. 15 illustrates an embodiment of coexistence of the NR and the LTE using the MBSFN subframe. The NR is supported by statically or semi-statically allocating an NR signal to an MBSFN region in an MBSFN subframe according to an MBSFN subframe configuration pattern shared with a terminal.

Figure 16:
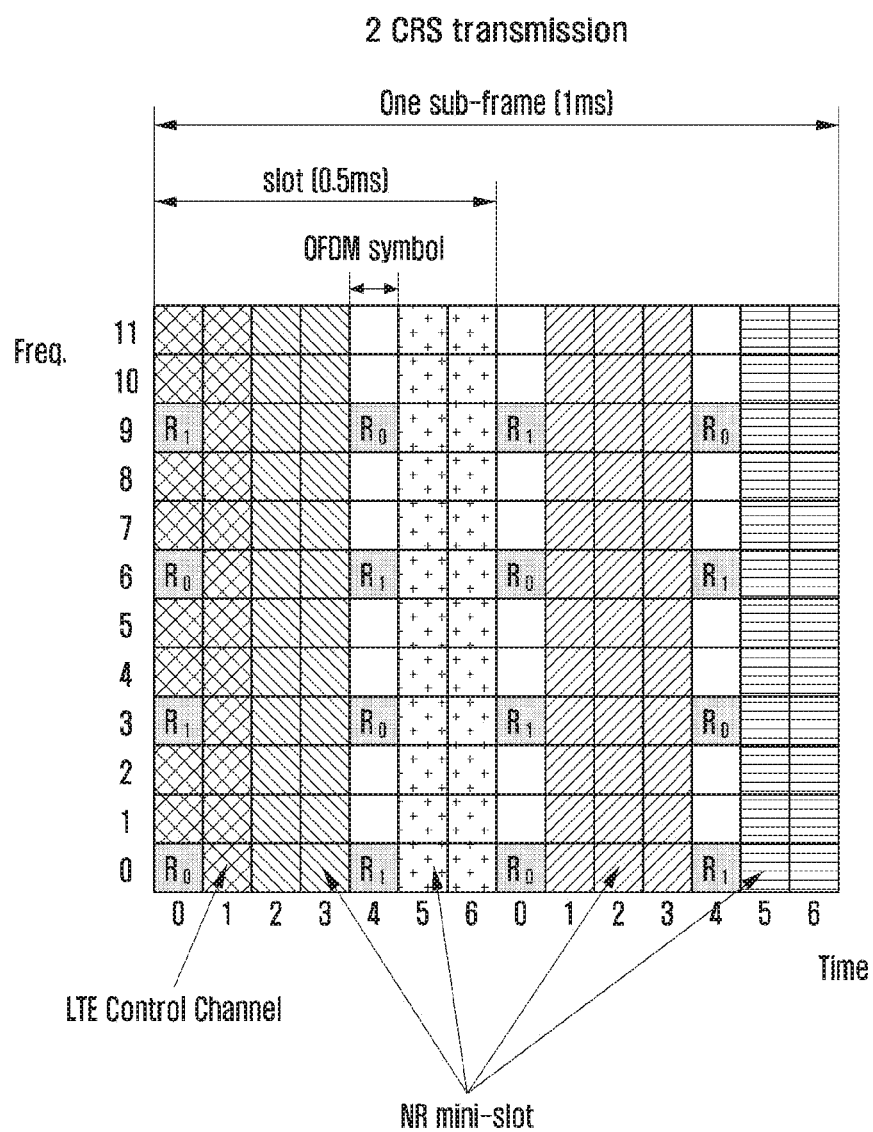
FIG. 16 is a diagram illustrating an embodiment of coexistence of NR using a mini-slot in a non-MBSFN subframe and LTE according to an embodiment of the disclosure.

FIG. 16 is a diagram illustrating an embodiment of coexistence of NR using a mini-slot in a non-MBSFN subframe and LTE according to an embodiment of the disclosure.

Referring to FIG. 16, a method of using a mini-slot for coexistence of the NR and the LTE even in a general subframe, not the MBSFN subframe may be considered. This method allows an NR signal and a CRS of the LTE do not interfere with each other by allocating the NR signal to a symbol in which there is no the CRS of the LTE. FIG. 16 illustrates an embodiment of coexistence of the NR and the LTE using the mini-slot in the non-MBSFN subframe. In the NR, two or three consecutive symbols among symbols with no CRS may be configured as one mini-slot, thereby transmitting the NR signal.

The method for coexistence of the NR and the LTE using the MBSFN subframe has limitation in transmitting a large amount of NR data since only six MBSFN subframes may be configured among ten, in the case of TDD, only 5 MBSFN subframes may be configured. Further, since the resource allocation through the MBSFN subframe configuration is performed statically or semi-statically, and the NR signal and the LTE signal are divided using the TDM, resource efficiency is largely deteriorated.

The method for coexistence of the NR and the LTE using the mini-slot may dynamically allocate a resource, thereby improving resource efficiency. However, since a control signal for data detection and an RS for channel estimation need to be additionally allocated to each mini-slot, overhead increases. Further, due to a characteristic of the mini-slot, it is difficult to allocate high throughput to one UE. That is, the mini-slot method is inappropriate for obtained high spectral efficiency in the NR.

The disclosure suggests a method and structure for coexistence of the LTE system and the NR system capable of improving resource efficiency by freely allocating an NR signal to a LTE system band. When the NR signal is freely allocated to the LTE system band, a CRS and control signals transmitted in the LTE and the NR signal collide with each other to thereby interfere with each other, and as the interference occurs, the CRS of the LTE may be distorted due to the data signal of the NR system, such that it may be difficult to measure a quality of the LTE channel Therefore, the disclosure suggests a method for coexistence of the LTE system and the NR system capable of improving spectral efficiency while allowing the NR system to freely use the resource while not interfering with the LTE system. According to the disclosure, both the two systems may dynamically dividedly use the resource according to a channel quality of a user and resource situations of users for every subframe, such that improvement of resource efficiency is expected.

Figure 17:
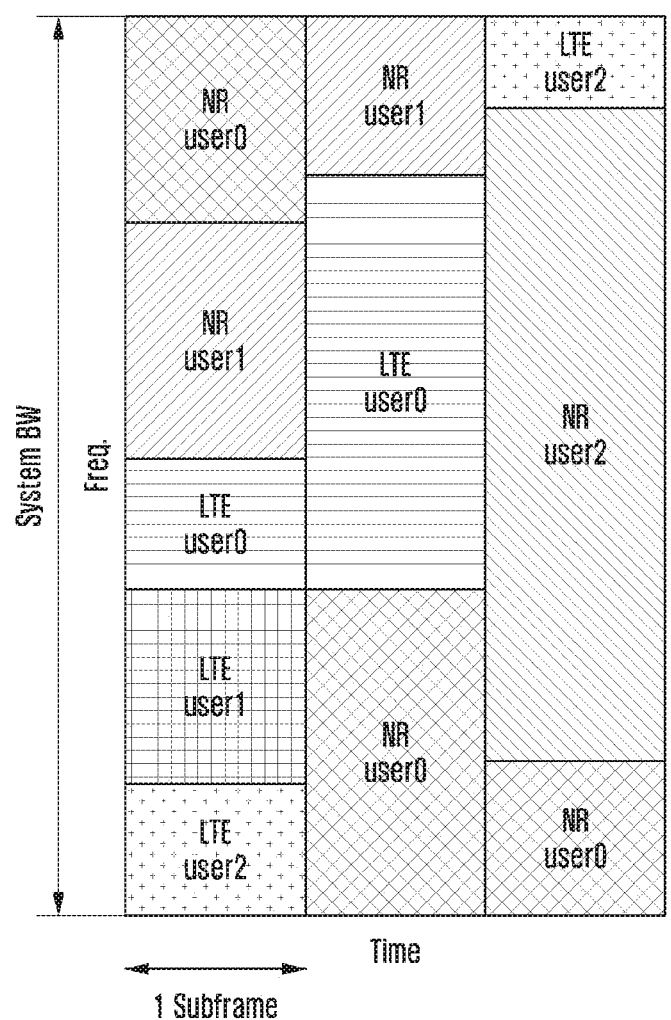
FIG. 17 is a diagram illustrating an example of frequency/time resource allocation for coexistence of LTE and NR according to an embodiment of the disclosure.

FIG. 17 is a diagram illustrating an example of frequency/time resource allocation for coexistence of LTE and NR according to an embodiment of the disclosure. The example illustrated in FIG. 17 is merely for describing the disclosure, and does not limit the scope of the disclosure.

Referring to FIG. 17, the LTE system and the NR system share a resource in the entire system band, and may dynamically dividedly use the resource according to a channel situation of a user of each system in a subframe unit. Since a resource with a good channel quality of a user may be scheduled and used in each system, multi-system multi-user diversity gain may be obtained.

Figure 18:
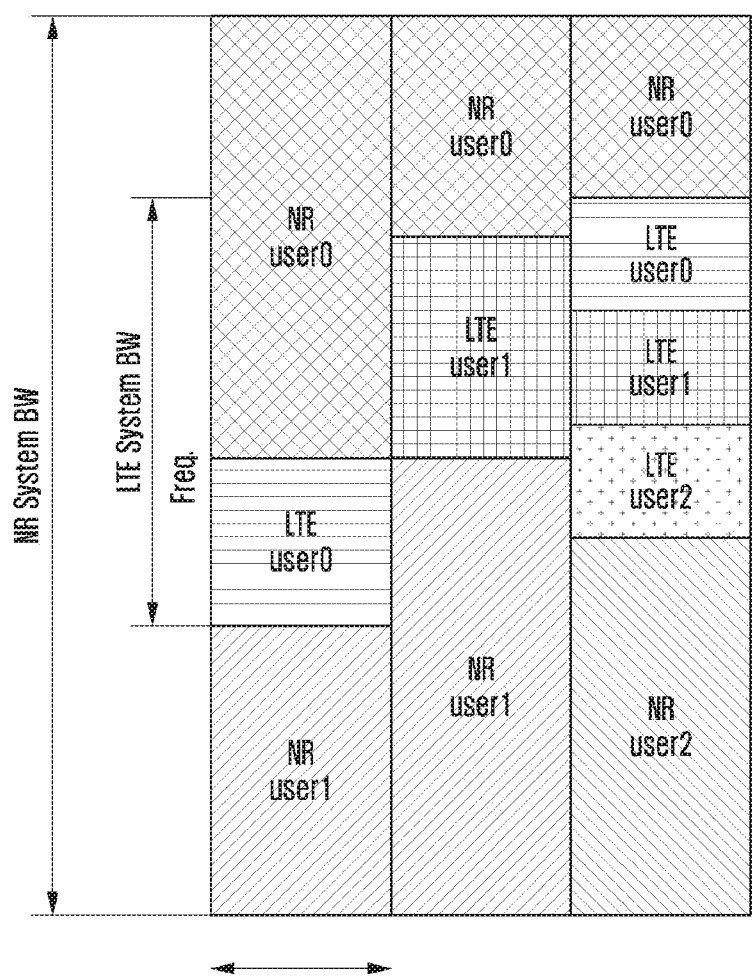
FIG. 18 is a diagram illustrating an example of coexistence of LTE and NR in a case in which a system bandwidth and a center frequency of the LTE and a system bandwidth and a center frequency of the NR are different from each other according to an embodiment of the disclosure.

FIG. 18 is a diagram illustrating an example of coexistence of LTE and NR in a case in which a system bandwidth and a center frequency of the LTE and a system bandwidth and a center frequency of the NR are different from each other according to an embodiment of the disclosure.

Referring to FIG. 18, the method suggested in the disclosure may be applied even in the case in which the NR system and the LTE system use different bandwidths or use different center frequencies as in FIG. 18. In the NR system band overlapping the LTE system band, the above-described puncturing method is applied to the NR signal, in order not to interfere with the CRS and the control signal of the LTE, and in a band that does not overlap the LTE system band, the NR signal is transmitted without considering the LTE signal.

Figure 19:
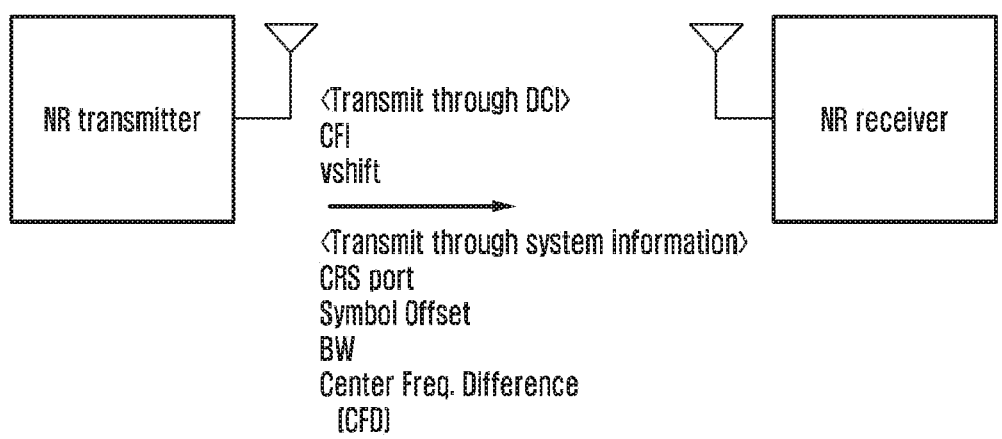
FIG. 19 is a diagram illustrating an embodiment of resource location information transferred from an NR base station to a terminal according to an embodiment of the disclosure.

FIG. 19 is a diagram illustrating an embodiment of resource location information transferred from an NR base station to a terminal according to an embodiment of the disclosure.

Referring to FIG. 19, an operation of the terminal according to an embodiment of the disclosure is as illustrated in FIG. 12. In S1200 of FIG. 12, the terminal may receive information on a location of a punctured resource from a base station through a higher layer or a physical layer. At this time, an NR receiver in the terminal may receive information on a location of a punctured resource from an NR transmitter in the NR base station as illustrated in FIG. 19.

According to an embodiment, since a CRS frequency location (vshift) changed according to a cell ID and control format indicator (CFI) information are values that may be changed frequently, the CRS frequency location and the CFI information may be transferred from the base station to the terminal through downlink control information (DCI) which is a physical layer control signal. According to another embodiment, parameters (CRS port, symbol offset, BW, and center frequency different (CFD)) used without being changed once the system is initially setup may be transferred from the base station to the terminal through system information in an initial access step, thereby reducing overhead.

Figure 20:
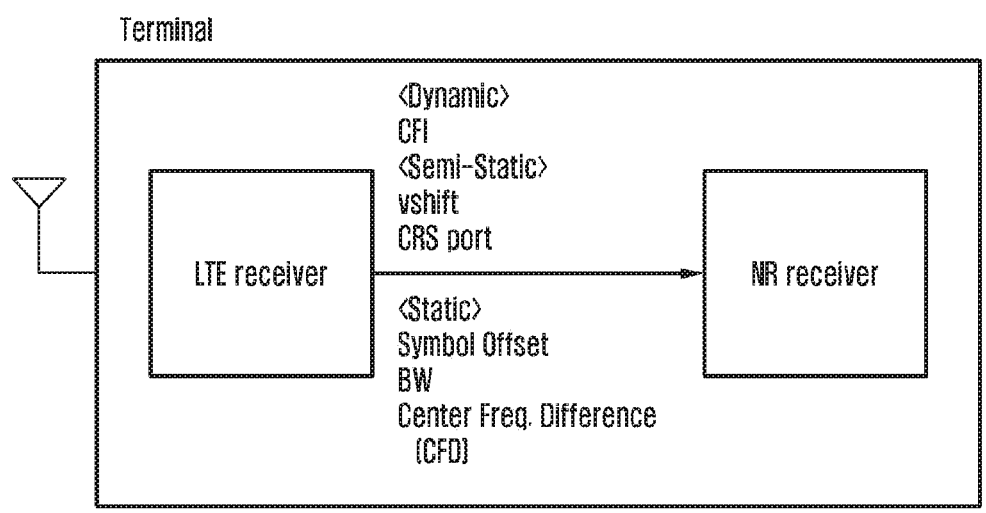
FIG. 20 is a diagram illustrating an embodiment in which an LTE receiver transfers information on punctured resource location to an NR receiver when a terminal supports a dual modem for LTE and NR according to an embodiment of the disclosure.

FIG. 20 is a diagram illustrating an embodiment in which an LTE receiver transfers information on punctured resource location to an NR receiver when a terminal supports a dual modem for LTE and NR according to an embodiment of the disclosure.

Referring to FIG. 20, the terminal may internally acquire information for calculating a location of a punctured resource by detecting an LTE signal. Since it may take time for the NR system to initially secure the entire coverage, an NR terminal that may receive an NR signal may include a dual modem chip capable of receiving an LTE signal as well. At this time, the information for calculating the location of the punctured resource may be transferred from the LTE receiver in the terminal to the NR receiver in the terminal. The parameters (CRS port, symbol offset, BW, CFD) that are not changed after the initial setup are detected only when LTE initial access occurs, to transfer the corresponding information to the NR receiver, and in the case of the CRS vshift and the CRS port that may be changed when handover occurs, the LTE receiver periodically detects system information and transfers the system information to the NR receiver. The CFI information may be configured so that a PCFICH is detected and transferred every TTI.

The terminal receiving the information on the location of the punctured resource in FIG. 19 or 20 may calculate the location of the punctured resource by using the received information. The following equations are merely an example, and do not limit the scope of the disclosure.

Puncturing location corresponding to control symbol = Equation 1

$$(N_{sym} - 1 - SymbolOffset + n) \bmod N_{sym},$$

$$\text{for } n = 0, \ldots, CFI - 1$$

$$N_{sym} = \begin{cases} 14 \text{ for Normal } CP \\ 12 \text{ for Extended } CP \end{cases}$$

Puncturing location corresponding to control symbol = Equation 2

$$vshift + N_{CRS}m + N_{punc}, \text{ form} = 0, 1, \ldots, 12\frac{N_{RB}}{N_{CRS}} - 1$$

$$N_{CRS} = \begin{cases} 6 \text{ for 1 } CRS \\ 3 \text{ for 2 } CRS \text{ or 4 } CRS \end{cases}$$

$N_{RB}$ is the total number of RBs according to BW of LTE.

1) When NR system does not allocate resource to location of DC $$N_{punc} = \begin{cases} -X \text{ for } CFD > 0 \text{ \& puncturing location adjustment region} \\ +X \text{ for } CFD < 0 \text{ \& puncturing location adjustment region} \\ 0 \text{ for } CFD = 0 \\ 0 \text{ for other regions} \end{cases}$$

2) When NR system allocates resource to location of DC $$N_{punc} = \begin{cases} +X \text{ for puncturing location adjustment region} \\ 0 \text{ for other regions} \end{cases} \quad \text{Equation 3}$$

$$X = +1 \text{ or } -1$$

Puncturing location corresponding to control symbol = Equation 4

$$(N_{sym} + n_{CRS} - SymbolOffset) \bmod N_{sym}$$

Normal CP $$n_{CRS} = \begin{cases} 0, 4, 7, 11 \text{ for 1 } CRS \text{ or 2 } CRS \\ 0, 1, 4, 7, 8, 11 \text{ for 4 } CRS \end{cases}$$

Extended CP $$n_{CRS} = \begin{cases} 0, 3, 6, 9 \text{ for 1 } CRS \text{ or 2 } CRS \\ 0, 1, 3, 6, 7, 9 \text{ for 4 } CRS \end{cases}$$

Thereafter, the terminal may receive a signal for the NR system, and may decode the received signal based on the calculated puncturing location. Specifically, once the NR signal is received, the terminal may demap the NR signal based on the information and then decode the NR signal.

In the uplink environment, since the LTE uses the resource UE-specifically, when resources used by the LTE and the NR are divided, coexistence of the LTE and the NR is possible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A signal transmitting method of a second base station in a wireless communication system comprising a first communication system and a second communication system, the method comprising:
   identifying a location of resource to be punctured based on a location of a control signal for the first communication system in a case that a transmission band of the first communication system and a transmission band of the second communication system overlap each other;
   transmitting information on the location of the resource to be punctured including at least one of a control format indicator (CFI), common reference signal frequency location information (vshift), a common reference signal port, or a bandwidth (BW) of the first communication system;
   puncturing a signal for the second communication system at the location of the resource to be punctured; and
   transmitting the punctured signal for the second communication system.

2. The method of claim 1, wherein the control signal includes a common reference signal (CRS).

3. The method of claim 1, further comprising:
   generating the information on the location of the resource to be punctured.

4. The method of claim 1, wherein the puncturing of the signal comprises:
   identifying a location of a center frequency of the first communication system and a location of a center frequency of the second communication system; and
   puncturing the signal for the second communication system at the location of the control signal for the first communication system based on the identified location of the center frequency of the first communication system and the identified location of the center frequency of the second communication system.

5. The method of claim 1,
wherein the first communication system is a long term evolution (LTE) communication system, and
wherein the second communication system is a 5$^{th}$ generation (5G) communication system.

6. The method of claim 1, wherein the identifying of the location of the control signal comprises receiving information on the location of the control signal for the first communication system from a base station supporting the first communication system.

7. A signal receiving method of a terminal in a wireless communication system comprising a first communication system and a second communication system, in which a transmission band of a first communication system and a transmission band of a second communication system overlap each other, the method comprising:
receiving information on a location of a resource to be punctured corresponding to a location of a control signal for the first communication system, wherein the information on the location of the resource to be punctured includes at least one of a control format indicator (CFI), common reference signal frequency location information (vshift), a common reference signal port, or a bandwidth (BW) of the first communication system;
identifying the location of the resource to be punctured;
receiving, from a second base station, a punctured signal for the second communication system; and
decoding the received signal based on the identified location of the resource to be punctured.

8. The method of claim 7, wherein the information on the location of the resource to be punctured is received by a higher layer or a physical layer.

9. The method of claim 7, wherein in the identifying of the location of the resource to be punctured comprises identifying blindly the location of the resource to be punctured.

10. The method of claim 7,
wherein the first communication system is a long term evolution (LTE) communication system, and
wherein the second communication system is a 5$^{th}$ generation (5G) communication system.

11. A second base station in a wireless communication system comprising a first communication system and a second communication system, the second base station comprising:
a transceiver configured to transmit and receive a signal; and
a controller configured to:
identify a location of resource to be punctured based on a location of a control signal for the first communication system in a case that a transmission band of the first communication system and a transmission band of the second communication system overlap each other,
control the transceiver to transmit information on a location of the resource to be punctured including at least one of a control format indicator (CFI), common reference signal frequency location information (vshift), a common reference signal port, or a bandwidth (BW) of the first communication system,
puncture a signal for the second communication system at the location of the resource to be punctured, and
control the transceiver to transmit the punctured signal for the second communication system.

12. The second base station of claim 11, wherein the control signal comprises a common reference signal (CRS).

13. The second base station of claim 11, wherein the controller generates the information on the location of the resource to be punctured.

14. The second base station of claim 11, wherein the controller identifies a location of a center frequency of the first communication system and a location of a center frequency of the second communication system, and punctures the signal for the second communication system at the location of the control signal for the first communication system based on the identified location of the center frequency of the first communication system and the identified location of the center frequency of the second communication system.

15. The second base station of claim 11, wherein the controller controls the transceiver to receive information on the location of the control signal for the first communication system from a base station supporting the first communication system.

16. A terminal in a wireless communication system comprising a first communication system and a second communication system in which a transmission band of the first communication system and a transmission band of the second communication system overlap each other, the terminal comprising:
a transceiver configured to transmit and receive a signal; and
a controller configured to:
receive information on a location of a resource to be punctured corresponding to a location of a control signal for the first communication system, wherein the information on the location of the resource to be punctured includes at least one of a control format indicator (CFI), common reference signal frequency location information (vshift), a common reference signal port, or a bandwidth (BW) of the first communication system,
identify the location of the resource to be punctured,
control the transceiver to receive a signal for the second communication system, and
decode the received signal based on the identified location of the punctured resource.

17. The terminal of claim 16, wherein the information on the location of the resource to be punctured is received by a higher layer or a physical layer.

* * * * *